United States Patent
Miller et al.

(10) Patent No.: US 11,077,809 B2
(45) Date of Patent: Aug. 3, 2021

(54) POWER SUPPLY UNIT FOR A UTILITY VEHICLE AND METHOD FOR OPERATING A POWER SUPPLY UNIT FOR A UTILITY VEHICLE

(71) Applicant: KNORR-BREMSE SYSTEME FUER NUTZFAHRZEUGE GMBH, Munich (DE)

(72) Inventors: Bernhard Miller, Weil der Stadt (DE); Falk Hecker, Markgroeningen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 47 days.

(21) Appl. No.: 16/491,451

(22) PCT Filed: Feb. 22, 2018

(86) PCT No.: PCT/EP2018/054440
§ 371 (c)(1),
(2) Date: Sep. 5, 2019

(87) PCT Pub. No.: WO2018/162248
PCT Pub. Date: Sep. 13, 2018

(65) Prior Publication Data
US 2020/0031295 A1      Jan. 30, 2020

(30) Foreign Application Priority Data

Mar. 6, 2017   (DE) ............... 10 2017 104 667.4

(51) Int. Cl.
*B60R 16/03*   (2006.01)
*H02J 7/00*    (2006.01)
(Continued)

(52) U.S. Cl.
CPC ........ *B60R 16/03* (2013.01); *H02J 7/007184* (2020.01); *H02J 9/06* (2013.01); *H02J 7/1461* (2013.01)

(58) Field of Classification Search
CPC ... B60R 16/03; H02J 7/007184; H02J 7/1461; H02J 9/06
(Continued)

(56) References Cited

U.S. PATENT DOCUMENTS 6,088,638 A      7/2000   Behrends et al.
9,431,850 B2 *   8/2016   Imai ................ H02J 7/1423
(Continued)

FOREIGN PATENT DOCUMENTS

| DE | 19734598 C1    |   | 2/1999  |          |
|----|----------------|---|---------|----------|
| DE | 19855245 A1    |   | 6/1999  |          |
| DE | 19916452 A1    |   | 10/2000 |          |
| DE | 10301528 A1    |   | 7/2004  |          |
| DE | 102005004330 A1| * | 8/2006  | B60R 16/03 |

(Continued)

OTHER PUBLICATIONS

International Search Report dated May 16, 2018, of the corresponding International Application PCT/EP2018/054440 filed Feb. 22, 2018.

*Primary Examiner* — Hal Kaplan
(74) *Attorney, Agent, or Firm* — Norton Rose Fulbright US LLP; Gerard Messina

(57) ABSTRACT

A power supply unit for a utility vehicle, including: an electrical energy store; a generator; an interface to at least one electrical load of the utility vehicle; a power line unit to connect the energy store and the generator to the interface, wherein the power line unit includes a switch for electrically isolating the generator from the interface; and a sensor unit to detect a fault in the electrical energy store and/or in at least one line of the power line unit and/or in the generator and to respond to the detected fault by actuating the switch to isolate the generator from the interface, in particular (Continued)

wherein the electrical energy store remains electrically connected to the interface. Also described are a related method, controller, utility vehicle and computer readable medium.

17 Claims, 7 Drawing Sheets

(51) Int. Cl.
    *H02J 9/06*           (2006.01)
    *H02J 7/14*           (2006.01)

(58) Field of Classification Search
    USPC .................................................. 307/9.1, 10.1
    See application file for complete search history.

(56) References Cited

U.S. PATENT DOCUMENTS

| | | | |
|---|---|---|---|
| 10,160,411 B2 * | 12/2018 | Fassnacht | ........... B60R 16/0231 |
| 2004/0227402 A1 | 11/2004 | Fehr et al. | |

FOREIGN PATENT DOCUMENTS

| | | | | |
|---|---|---|---|---|
| DE | 102005005236 A | | 8/2006 | |
| DE | 102005013440 A1 | | 10/2006 | |
| DE | 60224618 T2 | | 12/2008 | |
| DE | 102011002264 A1 | * | 1/2012 | ............ H02J 7/1423 |
| DE | 102011002264 A1 | | 1/2012 | |
| DE | 102012207624 A1 | | 11/2013 | |
| DE | 102013225020 A1 | | 6/2015 | |
| DE | 102014219133 A1 | | 3/2016 | |
| DE | 102015101235 A1 | | 7/2016 | |
| DE | 102005004330 A1 | | 8/2016 | |

\* cited by examiner

POWER SUPPLY UNIT FOR A UTILITY VEHICLE AND METHOD FOR OPERATING A POWER SUPPLY UNIT FOR A UTILITY VEHICLE

FIELD OF THE INVENTION

The present invention relates to a power supply unit for a utility vehicle and to a method for operating a power supply unit for a utility vehicle.

BACKGROUND INFORMATION

In modern utility vehicles, the alternator or called generator is often provided as an electrical energy store for charging the vehicle battery. The task of this electrical energy store is to stabilize and supply electrical energy to a vehicle electrical system of the utility vehicle having very many different electrical loads such as for example systems for vehicle driving, motor control, an injection system, a starter or steering transmission motors. If a fault now occurs on this electrical energy store or the vehicle power supply system, this leads to complete failure of the vehicle electrical supply, which in turn leads to safety-critical driving situations, since in this case there is the risk of failure of the vehicle driving functions, of the steering unit, of the braking unit, of the motor control and ultimately failure of the vehicle motor. Such a fault can consist for example in a short in this electrical energy store or between lines of the vehicle electrical system, in which case a generator charging the electrical energy store is also directly affected by such a fault and can likewise be damaged by this fault. Although such a fault is rare, if it does occur then the consequences of such a fault are extremely critical for the safety of the utility vehicle that is traveling and consequently also for the road users that are in the immediate surroundings of this utility vehicle.

SUMMARY OF THE INVENTION

Against this background, the present invention provides a way of improving vehicle safety.

This object may achieved by the subject matter as described herein.

The approach presented here provides a power supply unit for a utility vehicle, wherein the power supply unit has the following features:

an electrical energy store;
a generator,
an interface to at least one electrical load of the utility vehicle;
a power line unit configured to connect the energy store and the generator to the interface, wherein the power line unit has a switch for electrically isolating the generator from the interface; and
a sensor unit configured to detect a fault in the electrical energy store and/or in at least one line of the power line unit and/or in the generator and to respond to the detected fault by actuating the switch in order to isolate the generator from the interface, in particular wherein the electrical energy store remains electrically connected to the interface.

An electrical energy store can be understood to mean an energy store that can store energy in electrochemical, electrical or electromagnetic form. A generator can be understood to mean for example an electrical synchronous machine or asynchronous machine. The generator can be driven by a drive motor of the utility vehicle and/or can be coupled or may have been coupled to a driveshaft of this drive motor of the utility vehicle. A power line unit can be understood to mean a unit that has various electrical lines in order to connect the electrical energy store and/or the generator to the interface. A switch can be understood to mean an electrical or electromechanical element in order to break or make an electrically conductive connection between the generator and the interface. In particular, the switch in this case can achieve a switching state of the power line unit in which, despite the electrical isolation of the generator from the interface, the electrical store is still electrically conductively coupled to the interface. A sensor unit can be understood to mean a measuring unit that records for example an internal resistance of the generator and/or electrical energy store and/or a flow of current in at least one line of the power line unit as a measured value or reads in and evaluates such a measured value, wherein the switch is actuated accordingly if the measured value satisfies a predetermined criterion, for example represents an excessively low or excessively high internal resistance of the generator and/or an excessively high flow of current in one line of the power line unit. In this case, the sensor unit can infer a fault in the electrical energy store and/or in the at least one line of the power line unit or in the generator.

The approach presented here is based on the insight that the use of the switch actuated by the sensor unit allows reliable electrical isolation of the generator from the interface. Such an embodiment of the power supply unit affords the advantage that total failure of the vehicle electrical system of the utility vehicle can be prevented in the event of a fault in the generator that, although occurring rarely, still needs to be taken into consideration. A second line of the power line unit is for example still connected to the generator, which means that at least the electrical energy store can supply electrical energy to one or more electrical loads of the utility vehicle that are connected to the interface. This allows the setup of an emergency mode of operation for the utility vehicle in which, by way of example, it becomes possible for the utility vehicle to be safely stopped by using the electrical energy provided by the electrical energy store or generator in the electrical load connected to the interface. In this manner, the invention presented here can provide a way of improving vehicle safety. In the event of failure of the generator as a result of a short, further operation of the vehicle electrical system can be enabled by opening the connection to the interface by the still operational energy store.

According to a particularly advantageous embodiment of the approach proposed here, the electrical energy store can be in the form of an electrochemical energy store and/or in the form of a storage battery, in particular in the form of a vehicle battery of the utility vehicle. Such an embodiment of the approach proposed here affords the advantage of the use of an electrical energy store that is in many cases already present in utility vehicles within the realms of the advantageous power supply unit.

According to a further embodiment of the approach proposed here, the generator can be in the form of a three-phase generator and/or can be coupled or couplable to a driveshaft of a drive motor of the utility vehicle, in particular wherein the generator has a rectifier for supplying DC current to at least one line of the power line unit. Such an embodiment of the approach proposed here affords the advantage of being able to use a technically mature and inexpensive component as generator.

Of additional advantage is an embodiment of the approach proposed here in which the switch has at least one relay and/or a semiconductor switching element as switching element. Such a semiconductor switching element can be understood to mean for example a MOSFET transistor, a thyristor, a triac or the like. Such an embodiment of the approach proposed here likewise affords the advantage of the use of a widely available and inexpensive component as switch.

Electrical isolation of the interface from the generator can take place particularly safely and reliably if the switch has at least two series-connected switching elements, in particular wherein the switching elements are actuatable independently of one another.

A further conceivable embodiment of the approach proposed here is one in which the power line unit has two power lines isolable from one another by the switch and wherein the interface is configured to supply a first of the loads with current from the electrical energy store and to supply a second load with electrical energy from the generator. Such an embodiment of the approach proposed here affords a very high level of failsafety as a result of the redundant (which may be exclusive) supply of electrical energy to the loads from the electrical energy store and/or the generator.

Of further advantage is an embodiment of the approach presented here in which the sensor unit is configured to detect a short in the electrical energy store and/or in a line of the power line unit and/or in the generator as a fault.

The approach proposed here can be used particularly efficiently in a scenario in which, according to one embodiment of the power supply unit proposed here, the sensor unit is configured to detect an overload voltage state of at least one line of the power line unit leading to an overload of the electrical energy store, wherein the sensor unit is further configured so as, on detecting the overload state, to actuate the switch such that the generator is isolated from the electrical energy store. In this manner, a fault that is particularly critical in respect of road safety can be advantageously and very reliably detected and the effects of said fault can be lessened.

The advantages of the approach proposed here can be implemented particularly efficiently in a utility vehicle having a power supply unit according to one variant of the approach presented here, in particular wherein at least two loads are coupled to the interface and/or, as one load, a steering transmission motor is coupled to the interface as load.

In particular an embodiment of the approach proposed here in the form of a utility vehicle is implementable particularly advantageously, in the case of which utility vehicle the utility vehicle has two steerable axles the deflection of which is caused in each case by a steering transmission motor, characterized in that a steering transmission motor of a first of the steerable axle is supplied with electrical energy by the generator when the switch is open, and a steering transmission motor of the second of the steerable axles is electrically coupled to the electrical energy store, in particular wherein the first steerable axle is mechanically coupled to the second steerable axle, in particular wherein the steerable axles are coupled such that a steering movement of the first axle leads to an identical steering movement of the second axle. Such an embodiment of the approach proposed here in the form of the utility vehicle allows redundant and hence very safe actuation of at least one steering transmission motor, so that, even in the event of the fault in the electrical energy store, at least rudimentary operation of the steering is still possible by a steering transmission motor supplied with electrical energy by the generator and/or by a mechanical coupling of the two steerable axles, which contributes to a significant increase in road safety for the utility vehicle.

Particular safety, reliability and hence road safety are features of an embodiment of the approach proposed here as a utility vehicle in which the interface is configured to connect at least two loads to the electrical energy store and the generator by one line each. A redundant configuration of this kind for the interface therefore allows the at least two loads to be reliably supplied with electrical energy from the energy store and, should the latter have failed, from the generator. A configuration having such redundancy has a similar effect in reverse in the event of a short in the generator, in which case the electrical energy store maintains the supply to the at least two loads for a certain time.

The advantages of the approach proposed here can further be implemented in a very easily and efficiently operating manner in the form of a method for operating a power supply unit according to one variant presented here, wherein the method has the following steps:

detecting a fault in the electrical energy store and/or and also in the generator in at least one line of the power line unit; and actuating the the switch in response to the detected fault in order to isolate the generator from the interface, in particular wherein the electrical energy store remains electrically connected to the interface.

Additionally or alternatively, the generator can also be isolated from the faulty vehicle electrical system in order to ensure a supply of electrical energy to at least two loads if the vehicle electrical system or the electrical energy store has a short.

The approach presented here further provides a controller configured to perform, control or implement the steps of a variant of a method presented here in applicable devices.

This variant embodiment of the invention in the form of a controller can also achieve the object on which the invention is based quickly and efficiently.

To this end, the controller can have at least one computing unit for processing signals or data, at least one memory unit for storing signals or data, at least one interface to a sensor or to an actuator for reading in sensor signals from the sensor or for outputting control signals to the actuator and/or at least one communication interface for reading in or outputting data, which are embedded in a communication protocol. The computer unit can be for example a signal processor, a microcontroller or the like, wherein the memory unit can be a flash memory, an EEPROM or a magnetic memory unit. The communication interface can be configured to read in or output data wirelessly and/or by wire, wherein a communication interface that can read in or output wired data can read in these data from an applicable data transmission line or can output them to an applicable data transmission line electrically or optically, for example.

A controller can be understood in the present case to mean an electrical device that processes sensor signals and takes this as a basis for outputting control and/or data signals. The controller can have an interface that can be in hardware and/or software form. In the case of a hardware form, the interfaces can be for example part of what is known as a system ASIC containing a wide variety of functions of the controller. However, it is also possible for the interfaces to be separate, integrated circuits or to consist at least in part of discrete components. In the case of a software form, the interfaces can be software modules present on a microcontroller in addition to other software modules, for example.

Also advantageous is a computer program product or computer program having program code that can be stored on a machine-readable carrier or storage medium such as a semiconductor memory, a hard disk memory or an optical memory and is used to perform, implement and/or control the steps of the method according to one of the embodiments described above, in particular when the program product or program is executed on a computer or an apparatus.

Exemplary embodiments of the approach presented here are explained more precisely in the description below with reference to the figures.

DETAILED DESCRIPTION

Figure 1:
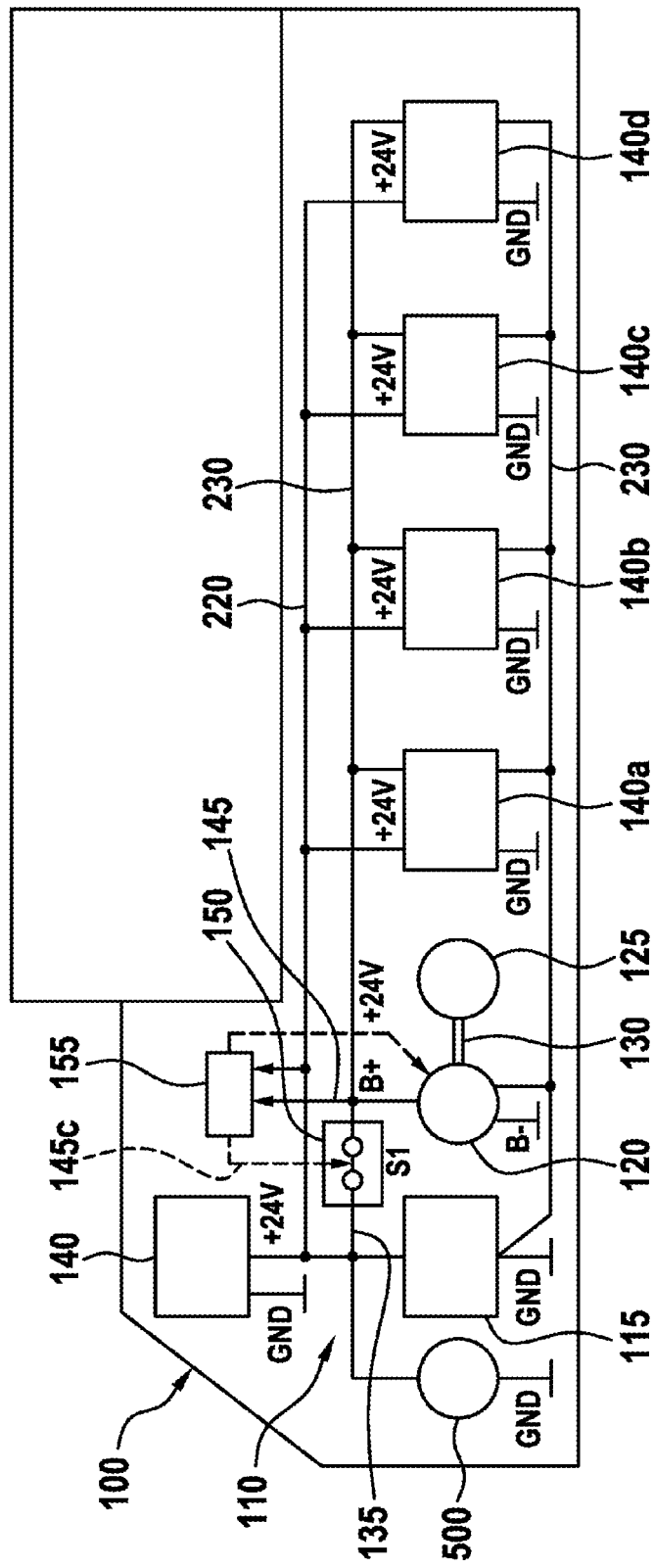
FIG. 1 shows a block diagram of a utility vehicle having a power supply unit according to one exemplary embodiment.

FIG. 1 shows a block diagram of a utility vehicle 100 having a power supply unit 110 according to one exemplary embodiment. The power supply unit 110 comprises an electrical energy store 115 configured for example in the form of a storage battery or the vehicle battery of the utility vehicle 100. Furthermore, the power supply unit 110 comprises a generator 120, for example coupled to a drive motor 125 of the utility vehicle 100 via the driveshaft 130 thereof. Further, the power supply unit 110 comprises an interface 135 to at least one electrical load 140. The electrical load 140 is configured for example as a vehicle steering system 140a, a driver assistance system 140b, a motor control unit 140c for controlling the drive motor 125 and/or a vehicle braking system 140d. In order to connect the electrical energy store 115 and the generator 120 to the interface 135, the power supply unit 110 has a power line unit 145, for example comprising multiple lines, wherein the power line unit 145 further has a switch 150 for isolating the generator 120 from the interface 135. The switch 150 can be configured as a relay or as a semiconductor switch, for example. In order to actuate the switch 150 in the event of a fault in the electrical energy store 115, in the generator 120 and/or in at least one line of the power line unit 145 as appropriate, there is further provision for a sensor unit 155 in order to detect this fault in the electrical energy store 115, in the generator 120 and/or in at least one line of the power line unit 145. In response to such a detected fault, the sensor unit 155 is now configured to actuate the switch 150 such that the interface 135 is electrically isolated from the generator 120.

The power supply unit 110 schematically represented in FIG. 1 can ensure that in the event of a fault in the generator 120, for example a short, there is no risk of the power supply collapsing in the power supply unit 110, which would also lead to a short in the vehicle battery 115 as a result of the outputs of the generator 120 being shorted, for example. Rather, opening the switch 150 in the event of a fault in the generator 120 and/or in a line of the power line unit 145 that is detected by the sensor unit 155 can electrically isolate an error source in the form of the faulty generator 120 from the power line unit 145, so that a remaining "shell" system of the power supply unit 110 can now distribute the electrical energy provided by the electrical energy store 115 to one or more applicable electrical loads 140a to 140d. If the electrical generator 120 is provided with sufficiently large dimensions, for example to deliver a power of at least 3.5 kW, then it is also possible for loads 140 of the utility vehicle 100 that, with sufficient power, can set in motion mechanical components such as for example a second steering axle 160a and a first steering axle 160b to be reliably actuated. Even if the power of the generator 120 is not sufficient for continuous operation of the load(s) 140, it is then at least possible for an emergency mode to be maintained by virtue of the utility vehicle 100 being brought to a standstill and hence a significant increase in road safety being able to be achieved in the event of the occurrence of the fault in the electrical energy store 115 or in the area of the generator 120.

The electrical energy store 115 therefore becomes a proper redundant power supply for safety-critical systems in the event of the occurrence of a fault in the generator 120 or the vehicle power supply system 220 thereof.

It is further also conceivable for the switch 150 to be arranged not directly at the output of the generator 120, but rather at the energy store 115, but in that case it should be ensured that the generator 120 can reliably deliver electrical energy to the interface 135 in the event of the switch being open.

Figure 2:
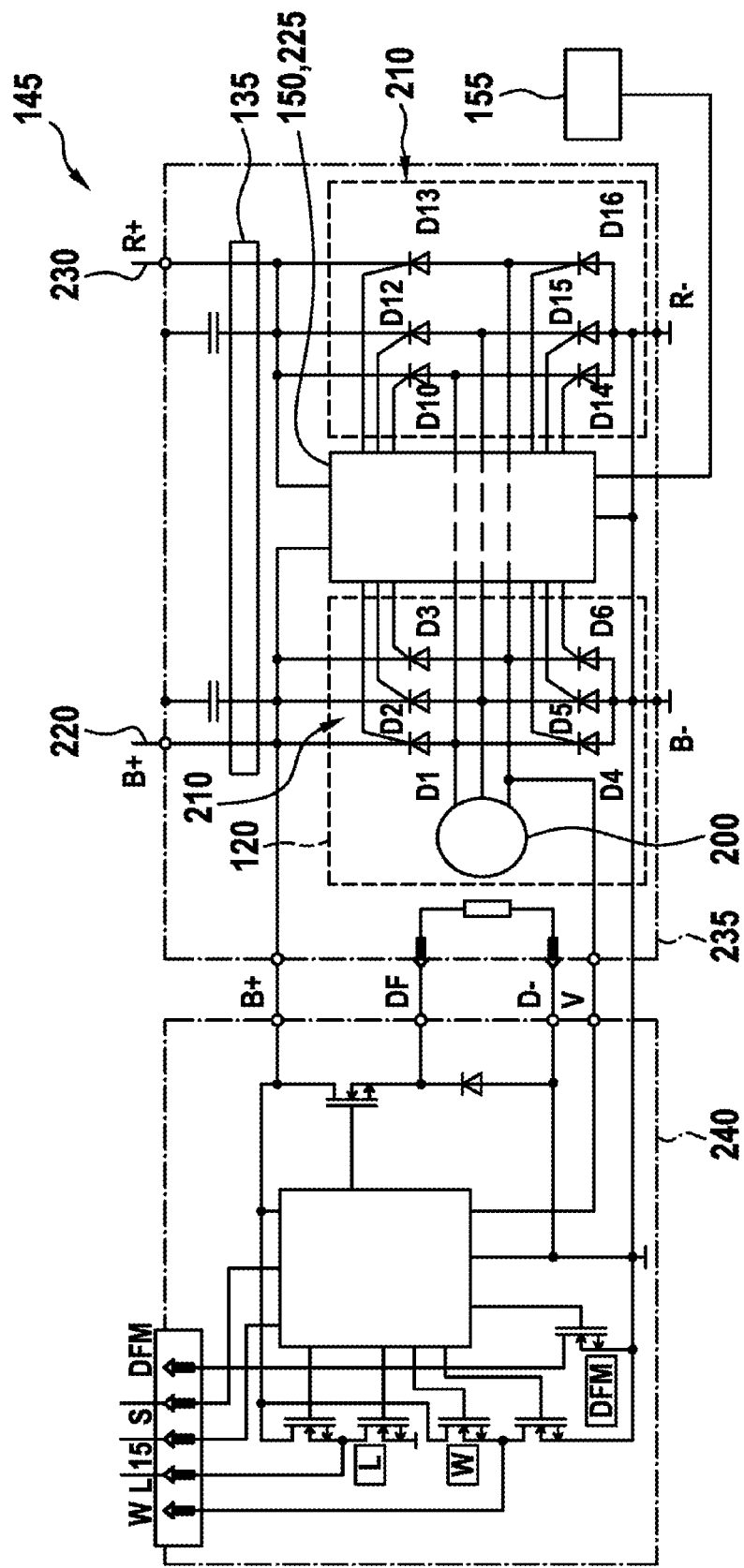
FIG. 2 shows a schematic circuit diagram representation of components of the power supply unit proposed here according to one exemplary embodiment.

FIG. 2 shows a schematic circuit diagram representation of components of the power supply unit 110 proposed here according to one exemplary embodiment. In this instance, it becomes clear from FIG. 2 that the generator 120 can have a synchronous or asynchronous machine 200 delivering a three-phase voltage to a rectifier 210, which uses appropriately controlled rectifier elements D1 to D16 such as for example thyristors (or diodes) to convert from the AC current delivered by the machine 200 into DC current, which can be forwarded via lines 220 and 230 (in this case denoted by B+ and R+) of the power line unit 145 and used for charging the energy store 115, for example. In order to allow electrical isolation of the lines 220 from the generator or the electrical energy store 115, there is provision for a switch control unit 225 that can perform actuation of the rectifier elements D1 to D16, so that for example these rectifier elements D1 to D16 are switched to a blocking mode in which no flow of current is possible via these rectifier elements. In this instance, it should be noted that the rectifier elements, which are arranged in two groups D1 to D6 and D10 to D16, can be assigned to the generator 120 even if, for reasons of illustration, the second group D10 to D16 of rectifier elements is arranged on a different side of the switch control unit 225 than the first group of rectifier elements D1 to D6.

In this instance, the branch depicted to the left of the switch control unit 225 is provided between the connections B+ and B− (i.e. the branch having the diodes D1 to D6), in order to make an electrical connection to the energy store 115, or the battery, and the branch depicted to the right of the switch control unit 225 is provided between the connections R+ and R− (i.e. the branch having the diodes D10 to D16), in order to supply at least one load with electrical energy. In this respect, the interface 135 depicted with reference to FIG. 1 can be regarded in FIG. 2 as a transfer area between the lines from the generator or the two groups of rectifier elements D1 to D16 and the connections B+ and R+.

The switch control unit 225 can furthermore perform output monitoring of the lines 220 and 230 to disconnect at least one output of the generator 120 or of the electrical energy store 115, for example in the event of a short, ascertained by the sensor unit 155, in the energy store 115, in the generator 120 or in the event of an occurrence of an overvoltage (load dump) in the lines 220 of the power line unit 145 and hence the risk of possible damage to the energy store 115, to a load 140 or to the generator 120.

The generator 120, the switch control unit 225 and the interface 135 can also be combined as a combined unit 235 and implemented as a single integrated component to produce an embodiment that saves installation space.

Furthermore, there can be provision for a generator regulator 240 allowing control or regulation of the operation of the machine 200. The sensor unit 155 can in this instance also be part of the rectifier 210 or the control unit thereof. In this case, the switch 150 can also be implemented by virtue of the applicable actuation of the rectifier elements that of the diodes or thyristors D1 to D16. In this instance, however, the circuit topology should ensure that electrical energy for operating a load 140 is still transmitted to the interface 135 in the event of disconnection of rectifier elements D1 to D16; hence, not all rectifier elements should be switched to the blocking mode at the same time.

Figure 3:
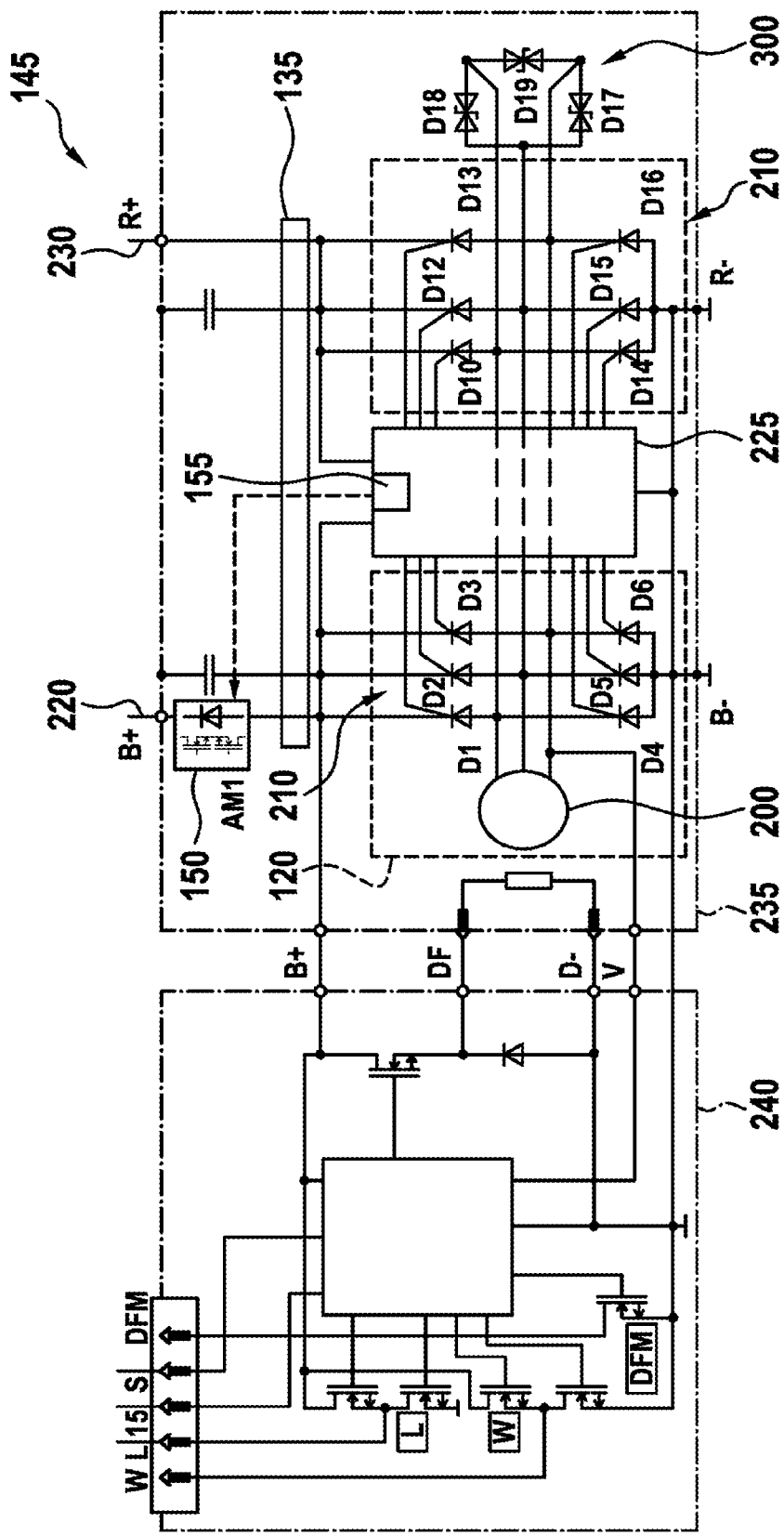
FIG. 3 shows a schematic circuit diagram representation of components of the power supply unit proposed here according to a further exemplary embodiment.

FIG. 3 shows a schematic circuit diagram representation of components of the power supply unit 110 proposed here according to a further exemplary embodiment. The circuit topology depicted in FIG. 3 for the components of the power supply unit 110 substantially corresponds to the circuit topology already depicted with reference to FIG. 2, but with the sensor unit 155 now being integrated directly in the switch control unit 225 and actuating a separately provided switch 150 in the form of a disconnection module AM1 directly at the output of the line B+. This switch 150 in the form of the disconnection module AM1, in this case for example in the form of a switchable diode or of a thyristor, ensures reliable isolation of the energy store 150 in the form of the vehicle battery from the generator 120 in the event of an error, even a short at the rectifier elements D1 to D6. Furthermore, a few suppressor diodes D17 to D19 are arranged in the diode circuit arrangement 300 according to the representation from FIG. 3, these being provided as overvoltage protection (load dump) to avoid overloading the energy store 115.

Figure 4:
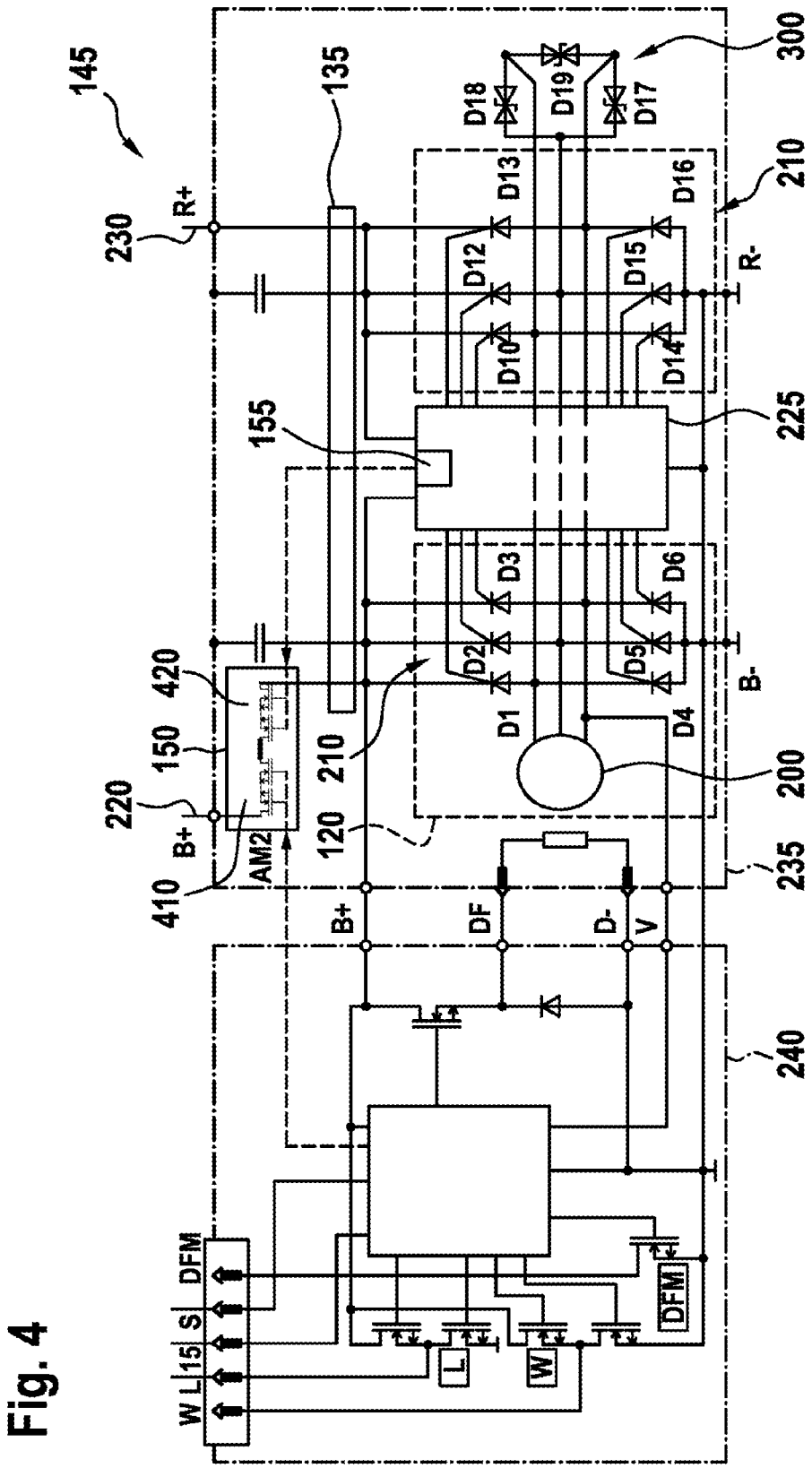
FIG. 4 shows a schematic circuit diagram representation of components of the power supply unit proposed here according to a further exemplary embodiment.

FIG. 4 shows a schematic circuit diagram representation of components of the power supply unit 110 proposed here according to a further exemplary embodiment. The circuit topology depicted in FIG. 3 for the components of the power supply unit 110 substantially corresponds to the circuit topology already depicted with reference to FIG. 3, but with the switch 150 now being configured in the form of an alternative disconnection module AM2, in which there is provision for two separately actuatable switching elements 410 and 420. The switching elements 410 and/or 420 can be configured in this instance as a relay and/or as a semiconductor switching element, as depicted in an exemplary manner in FIG. 4 in the form of a MOSFET transistor as power electronics component. The first switching element 420 can be actuated in this instance by the generator regulator 240, for example, whereas the second switching element 420 is actuated by the sensor unit 155. As soon as one of the switching elements 410 and 420 is put into the open state, this prevents a transmission of electrical energy via the switch 150, so that the battery connected to the lines 220 or the electrical energy store 115 is isolated from the generator 120. In this manner, it is possible to ensure in a very reliable manner that interruption of the electrical connection to the energy store 115 is performed in the event of an error, for example when a fault is detected.

Figure 5:
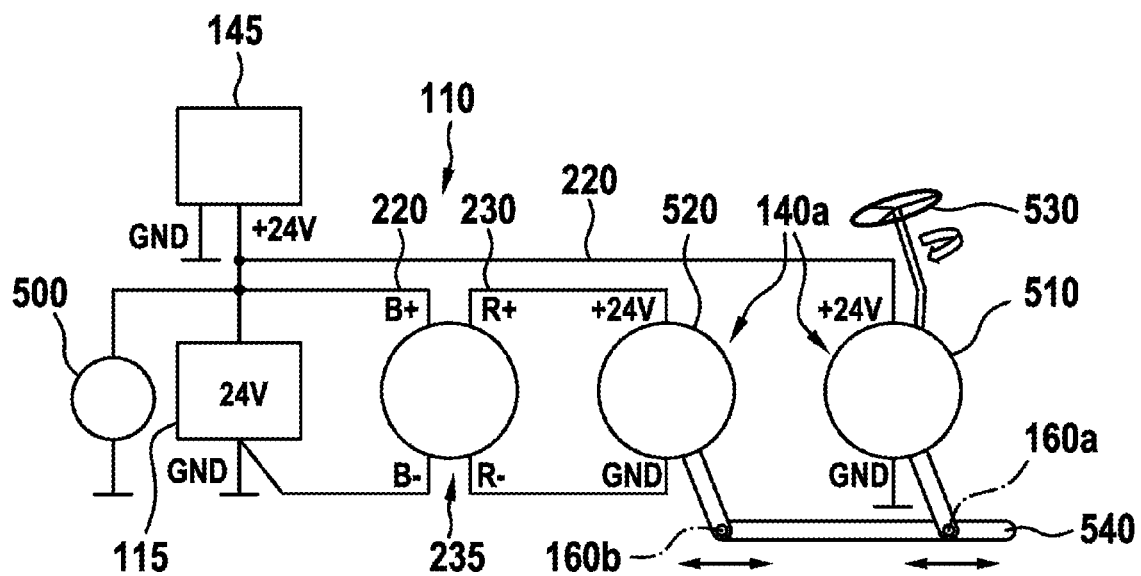
FIG. 5 shows a schematic representation of a power supply unit according to one exemplary embodiment in combination with specific loads of the utility vehicle.

FIG. 5 shows a schematic representation of a power supply unit 110 according to one exemplary embodiment in combination with specific loads of the utility vehicle 100. In particular, FIG. 5 depicts an energy store 115 in the form of the vehicle battery, for example with a 24-volt operating voltage, which is connected by the power line unit 145 to a starter 500 of the utility vehicle and to the generator 120 of the utility vehicle, which generator, for example according to the representations from FIGS. 2 to 4, is in the form of a three-phase generator and can output electrical energy via the connection between B+ and B− and the connection between R+ and R−. The connection between R+ and R− can in this instance likewise be understood as belonging to the power line unit 145, since in the present case the infrastructure of the utility vehicle 100 that is required for transmitting electrical energy can be understood as power line unit 145.

According to the circuit topology depicted in FIG. 5, the energy store 115 is configured to supply electrical energy to a first steering transmission motor 510 as first load, the generator in the combined unit 235 being configured to supply electrical energy to a second steering transmission motor 520 as second load. The first steering transmission motor 510 can deliver a power of 3 kW and perform a deflection of a first of two steering axles 160, for example. By way of example, the first steering transmission motor 510 can also receive actuation signals from a steering wheel or a steering unit 530 from a driver of the utility vehicle 100 and translate them into an applicable steering moment or into an applicable steering angle and hence into a deflection of the first steering axle 160. The second steering transmission motor 520 is configured to deflect a second of the steering axles 160 (for example likewise by using steering signals from the steering unit 530, this not being depicted more specifically in FIG. 5 for reasons of clarity, however), for example, and to this end can likewise deliver a power of 3 kW, for example. In the present exemplary embodiment, which is depicted schematically in FIG. 5, the two steering axles 160 are coupled to a steering rod 540, so that a deflection of the first steering axle 160a also leads to a corresponding deflection of the second steering axle 160b, and vice versa.

The second steering axle 160b, which forms a trailing axle, for example, is therefore deflected by the second steering transmission motor 520, which is supplied with electrical energy directly by the second output (i.e. the output having the connections R+ and R−) of the generator 120 of the combined unit 235. In this manner, it is possible to ensure that in the event of a fault in the energy store 115, in the generator 120 or in a line of the power line unit 145 that is connected directly to the energy store 115, there is no risk of total failure of the steerability of the utility vehicle 100, since at least the second steering transmission motor 520 can still be reliably supplied with electrical energy as a result of the decoupling of the energy store 115 or of the generator 120 in the combined unit 235 according to FIGS. 2 to 4. Additionally, the steering rod 540 can ensure that the deflection of the second steering axle 160b is also converted into a corresponding interpretation of the first steering axle 160a and hence it is still possible for the vehicle 100 to be steered even in the event of failure of or a fault in the energy store 115. The approach proposed here further affords the elimination of an expensive hydraulic alternative solution as a result of intelligent interruption of different lines of the power line unit 145.

Short detection of a short in the energy store 115, for example as a result of the drop in the voltage of the vehicle battery, and/or in the vehicle electrical system of the power line unit 145 or in the generator 120, can therefore be effected by the sensor unit 155 in or on the combined unit 235, so that the electrical isolation of the generator 120 from the battery or the energy store 115 can be performed reliably. In this instance, the applicable requisite components can be combined together in a combined unit 235 that can be embodied in a compact manner and are therefore able to be accommodated in a manner that saves installation space. Such a combined unit 235 has two separate outputs B+/− and R+/−, for example, that can be used to apply electrical energy to different subbranches of the power line unit 145.

Figure 6:
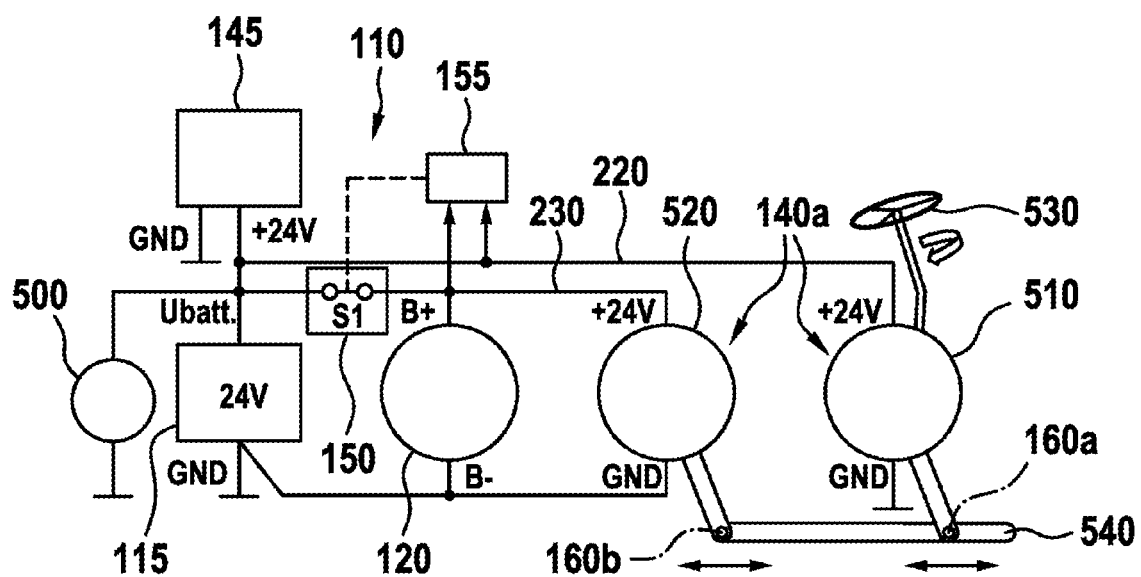
FIG. 6 shows a schematic representation of a power supply unit according to a further exemplary embodiment in combination with specific loads of the utility vehicle.

FIG. 6 shows a schematic representation of a power supply unit 110 according to a further exemplary embodiment in combination with specific loads of the utility vehicle 100. In contrast to the circuit topology depicted in FIG. 5 for the components of the power supply unit 110, there is now no provision for a combined unit 235 as in the representation from FIG. 5, but rather the sensor unit 155 and the switch 150 are now configured or arranged separately from the generator 120. However, it is again possible to see that the switch 150 allows electrical isolation of the second steering transmission motor 520 from the energy store 115 or generator 120 if for example the sensor unit 155 ascertains that there is a fault in the energy store 115 or in the generator 120 or a voltage drop on lines of the power line unit 145.

Figure 7:
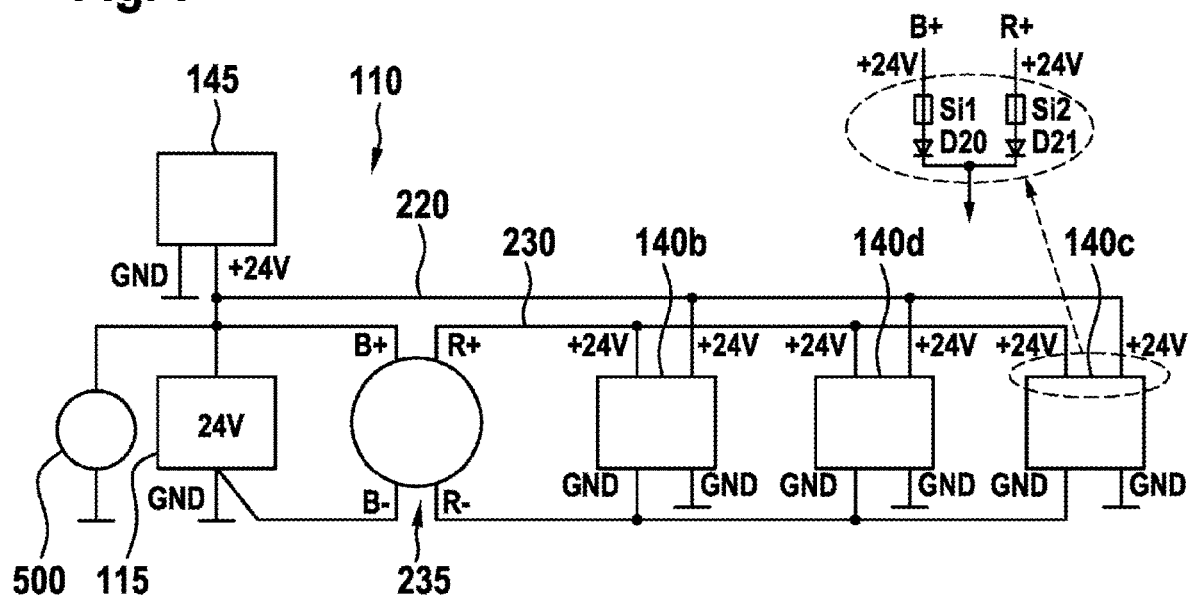
FIG. 7 shows a schematic representation of a power supply unit according to a further exemplary embodiment in combination with specific loads of the utility vehicle.

FIG. 7 shows a schematic representation of a power supply unit 110 according to a further exemplary embodiment in combination with specific loads of the utility vehicle 100. In contrast to FIG. 5, there is now provision for a redundant supply of energy to the loads by both the energy store 115 and the generator 120 in the unit 135. By way of example, the loads 140 can be configured not only as the steering transmission motors 510 and 520 depicted in FIGS. 5 and 6 but alternatively and/or additionally also as units for vehicle driving such as for example a driver assistance system 140b, a motor control unit 140c and/or a control unit 140d for a vehicle brake. In this manner, it is possible for a redundant power supply to be implemented for safety-critical vehicle systems. In the individual vehicle systems, it is then possible, for example in accordance with the circuit diagram detail depicted in FIG. 7, for the electrical energy to be drawn from the connection B+ or from the connection R+, depending on which of the two connections can provide an appropriate electrical energy required for operating the vehicle system. This case, it is possible for the second generator output (R+) to be intended to deliver a lower output power if need be, for example, when only the vehicle systems depicted in FIG. 7 and not correspondingly powerful steering transmission motors need to be supplied with electrical energy. This leads to the rectifier elements D10 to D16 being able to be configured to transmit lower electrical powers and hence to the heat losses at the applicable rectifier elements D10 to D16 being able to be minimized or alternatively also in turn the electrical or electronic switches being able to be altered for example as MOSFET semiconductors. To check the operation of the switchable rectifier elements D1 to D16, which can be constructed from or can contain thyristors, for example, and of the disconnection module depicted in FIGS. 3 and 4 in the generator 120, these are disconnected, at sporadic intervals, for example, and the actual disconnection thereof is monitored. This ensures that the output of the generator 120 can at all times be reliably isolated from the battery in the event of a short (of the battery or generator) and that the energy store 115 can at all times be reliably isolated from the generator 120 in the event of the occurrence of a fault in the generator 120.

In order to prevent failure of the generator 120 even in the event of a short of the at one of the rectifier elements D1 to D16, for example an additional diode or two low-impedance FET semiconductors acting as electronic switches isolate the generator from the battery or the energy store 115, as depicted in FIG. 3 or 4 with the disconnection module AM1 or AM2 as switch 150. The diode and the electronic switch (AM 1) can also be placed outside the generator 120 or the applicable combined unit 235.

Furthermore, according to one exemplary embodiment, safety-critical systems of the utility vehicle 100 can be supplied with power both from the energy store 115 and from the second output R+ of the generator 120 or of the combined unit 235. An additional circuit decouples the two power supplies for example by two diodes, as depicted in FIG. 7 with the diodes D20 and D21, and prevents reciprocal impairment of the availability of the two supply paths (220, 230). In the event of a short in the diodes D20 and D21, the fuses Si1 and Si2, as depicted in the circuit diagram detail from FIG. 7, or resistors ensure continuation of the supply of power to the respective safety-critical system and reliable isolation between the two supply paths (220, 230).

In the event of an overvoltage (Load Dump), the battery voltage can be protected from overvoltage by disconnecting the rectifier elements D1 to D16. When a powerful motor is used at the R+ connection, an overvoltage as a result of a load dump can be eliminated by actuating the motor as appropriate. The motor (3 kW) can be actuated in this case such that it remains at a standstill. Alternatively, suppressor diodes D17, D18, D19 between the respective generator connections can protect the possibly blocked rectifier elements from harmful overvoltage, as depicted more specifically in FIGS. 3 and 4.

Figure 8:
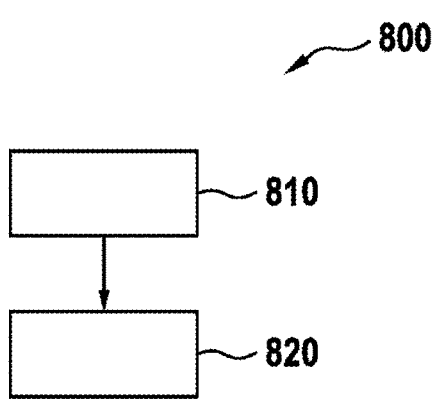
FIG. 8 shows a flowchart of an exemplary embodiment of the approach proposed here as a method.

FIG. 8 shows a flowchart of an exemplary embodiment of the approach proposed here as method 800 for operating a power supply unit according to one exemplary embodiment. The method 800 comprises a step 810 of detecting a fault in the electrical energy store and/or in at least one line of the power line unit and a step 820 of actuating the the switch in response to the detected fault in order to isolate the electrical energy store from the interface.

Figure 9:
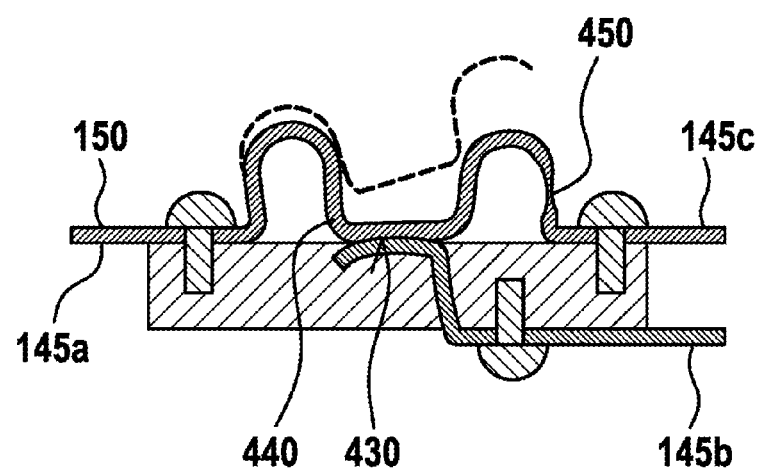
FIG. 9 shows a schematic representation of a switch for irreversibly opening in the event of an error.

FIG. 9 shows a representation as an alternative to a fuse or a conventional switch 150. A pretensioned spring plate 440 closes a switching contact surface, so that there is a connection between generator and battery that is capable of carrying a high current.

In the event of an error, a control line 145c is used to supply a current, so that the spring plate 440 melts at a constriction 450. As a result, the spring plate relaxes and opens the switching contact 430. The connection 150 between the vehicle battery 115 and the generator 120 is therefore permanently broken.

LIST OF REFERENCE SIGNS

100 Utility vehicle
110 Power supply unit
115 Energy store
120 Generator
125 Drive motor
130 Driveshaft
135 Interface
140 Electrical load
140a Vehicle steering system
140b Driver assistance system
140c Motor control unit
140d Vehicle brake, vehicle braking control unit
145a Power line unit—vehicle electrical system
145b Power line unit—redundancy
145c Control line
150 Switch
155 Sensor unit
160a First steering axle
160b Second steering axle
200 Machine
210 Rectifier
D1-D16 Rectifier elements
220 Lines—vehicle electrical system supply
225 Switch control unit
230 Lines—redundant supply
235 Combined unit
240 Generator regulator
300 Diode circuit arrangement, suppressor circuit
410, 420 Switching elements
430 Switching contact
440 Spring plate
450 Constriction in plate
500 Starter
510 First steering transmission motor
520 Second steering transmission motor
530 Steering unit, steering wheel
540 Steering rod
800 Method for operating
810 Step of detecting
820 Step of actuating

The invention claimed is:

1. A power supply unit for a utility vehicle, comprising:
an electrical energy store;
a generator;
an interface to at least one electrical load of the utility vehicle;
a power line unit to connect the energy store and the generator to the interface, wherein the power line unit includes a switching element for electrically isolating the generator from the interface; and
a sensor unit to detect a fault in the electrical energy store and/or in at least one line of the power line unit and/or in the generator and to respond to the detected fault by actuating the switching element to isolate the generator from the interface, wherein the electrical energy store remains electrically connected to the interface;
wherein the utility vehicle has two steerable axles, a deflection of which is caused in each case by a steering transmission motor, wherein a steering transmission motor of a first of the steerable axles is supplied with electrical energy by the generator when the switch is open, and a steering transmission motor of the second of the steerable axles is electrically coupled to the electrical energy store.

2. The power supply unit of claim 1, wherein the electrical energy store includes an electrochemical energy store and/or a storage battery of the utility vehicle.

3. The power supply unit of claim 1, wherein the generator includes a three-phase generator and/or is coupled or couplable to a driveshaft of a drive motor of the utility vehicle.

4. The power supply unit of claim 1, wherein a switch has at least one relay and/or a semiconductor switching element as the switching element.

5. The power supply unit of claim 4, wherein the switch has at least two series-connected switching elements, and wherein the switching elements are actuatable independently of one another.

6. The power supply unit of claim 1, wherein the power line unit has two power lines isolatable from one another by the switch, and wherein the interface is configured to supply a first of a plurality of loads with current from the electrical energy store and to supply a second load with electrical energy from the generator.

7. The power supply unit of claim 1, wherein the sensor unit is configured to detect a short in the electrical energy store and/or in a line of the power line unit and/or in the generator as a fault.

8. The power supply unit of claim 1, wherein the sensor unit is configured to detect an overload voltage state of at least one line of the power line unit leading to an overload of the electrical energy store, and wherein the sensor unit is further configured so as, on detecting the overload state, to actuate the switching element such that the generator is isolated from the electrical energy store.

9. The power supply unit of claim 1, wherein the electrical energy store includes an electrochemical energy store and/or a storage battery, in the form of a vehicle battery of the utility vehicle.

10. The power supply unit of claim 1, wherein the generator includes a three-phase generator and/or is coupled or couplable to a driveshaft of a drive motor of the utility vehicle, and wherein the generator has a rectifier for supplying DC current to at least one line of the power line unit.

11. A utility vehicle, comprising:
a power supply unit for a utility vehicle, including:
an electrical energy store;
a generator;
an interface to at least one electrical load of the utility vehicle;
a power line unit to connect the energy store and the generator to the interface, wherein the power line unit includes a switching element for electrically isolating the generator from the interface; and
a sensor unit to detect a fault in the electrical energy store and/or in at least one line of the power line unit and/or in the generator and to respond to the detected fault by actuating the switching element to isolate the generator from the interface, wherein the electrical energy store remains electrically connected to the interface;
wherein at least two loads are coupled to the interface and/or, as one load, a steering transmission motor is coupled to the interface as load, and
wherein the utility vehicle has two steerable axles, a deflection of which is caused in each case by a steering transmission motor, wherein a steering transmission motor of a first of the steerable axles is supplied with electrical energy by the generator when the switch is open, and a steering transmission motor of the second of the steerable axles is electrically coupled to the electrical energy store.

12. The utility vehicle of claim 11, wherein the interface is configured to connect at least two loads to the electrical energy store and the generator by one line each.

13. The utility vehicle of claim 11, wherein the first steerable axle is mechanically coupled to the second steerable axle, wherein the steerable axles are coupled such that a steering movement of the first axle leads to an identical steering movement of the second axle.

14. A method for operating a power supply unit of a utility vehicle, the method comprising:
    detecting a fault in an electrical energy store, in a generator and/or in at least one line of a power line unit, wherein the power supply unit includes:
    the electrical energy store;
    the generator;
    the interface to at least one electrical load of the utility vehicle;
    the power line unit to connect the energy store and the generator to the interface, wherein a power line unit includes a switching element for electrically isolating the generator from the interface; and
    a sensor unit to detect a fault in the electrical energy store and/or in the at least one line of the power line unit and/or in the generator and to respond to the detected fault by actuating the switching element in response to the detected fault to isolate the generator from the interface, wherein the electrical energy store remains electrically connected to the interface;
    wherein the utility vehicle has two steerable axles, a deflection of which is caused in each case by a steering transmission motor, wherein a steering transmission motor of a first of the steerable axles is supplied with electrical energy by the generator when the switch is open, and a steering transmission motor of the second of the steerable axles is electrically coupled to the electrical energy store.

15. A control unit for operating a power supply unit of a utility vehicle, comprising:
    a controller configured to perform the following:
    detecting a fault in an electrical energy store, in a generator and/or in at least one line of a power line unit, wherein the power supply unit includes:
    the electrical energy store;
    the generator;
    the interface to at least one electrical load of the utility vehicle;
    the power line unit to connect the energy store and the generator to the interface, wherein the power line unit includes a switching element for electrically isolating the generator from the interface; and
    a sensor unit to detect the fault in the electrical energy store and/or in the at least one line of the power line unit and/or in the generator and to respond to the detected fault by actuating the switching element in response to the detected fault to isolate the generator from the interface, wherein the electrical energy store remains electrically connected to the interface;
    wherein the utility vehicle has two steerable axles, a deflection of which is caused in each case by a steering transmission motor, wherein a steering transmission motor of a first of the steerable axles is supplied with electrical energy by the generator when the switch is open, and a steering transmission motor of the second of the steerable axles is electrically coupled to the electrical energy store.

16. A non-transitory computer readable medium having a computer program, which is executable by a processor, comprising:
    a program code arrangement having program code for operating a power supply unit of a utility vehicle, by performing the following:
    detecting a fault in an electrical energy store, in a generator and/or in at least one line of a power line unit, wherein the power supply unit includes:
    the electrical energy store;
    the generator;
    the interface to at least one electrical load of the utility vehicle;
    the power line unit to connect the energy store and the generator to the interface, wherein the power line unit includes a switching element for electrically isolating the generator from the interface; and
    a sensor unit to detect a fault in the electrical energy store and/or in the at least one line of the power line unit and/or in the generator and to respond to the detected fault by actuating the switching element in response to the detected fault to isolate the generator from the interface, wherein the electrical energy store remains electrically connected to the interface;
    wherein the utility vehicle has two steerable axles, a deflection of which is caused in each case by a steering transmission motor, wherein a steering transmission motor of a first of the steerable axles is supplied with electrical energy by the generator when the switch is open, and a steering transmission motor of the second of the steerable axles is electrically coupled to the electrical energy store.

17. The computer readable medium of claim 16, wherein the electrical energy store includes an electrochemical energy store and/or a storage battery of the utility vehicle.

* * * * *